(12) United States Patent
Good et al.

(10) Patent No.: US 8,511,608 B1
(45) Date of Patent: Aug. 20, 2013

(54) TRAILING EDGE FLAP SYSTEM

(75) Inventors: Mark Steven Good, Seattle, WA (US); Alan Keith Prichard, Gig Harbor, WA (US)

(73) Assignee: The Boeing Company, Chicago, IL (US)

( * ) Notice: Subject to any disclaimer, the term of this patent is extended or adjusted under 35 U.S.C. 154(b) by 334 days.

(21) Appl. No.: 12/946,075

(22) Filed: Nov. 15, 2010

(51) Int. Cl.
*B64C 5/10* (2006.01)

(52) U.S. Cl.
USPC .................. 244/99.3; 244/214; 244/215

(58) Field of Classification Search
USPC .......... 244/99.2, 75.1, 99.5, 216, 224, 210, 244/87, 223, 230, 99.3; 92/90, 92
See application file for complete search history.

(56) References Cited

U.S. PATENT DOCUMENTS

| | | | |
|---|---|---|---|
| 1,605,398 A | 11/1926 | Fairey | |
| 1,652,618 A | 12/1927 | Fairey | |
| 3,767,140 A * | 10/1973 | Johnson | 244/216 |
| 3,987,983 A * | 10/1976 | Cole | 244/216 |
| 4,444,368 A * | 4/1984 | Andrews | 244/216 |
| 5,050,822 A | 9/1991 | Whitehouse et al. | |
| 5,749,546 A | 5/1998 | Blackner et al. | |
| 7,063,292 B2 | 6/2006 | Perez-Sanchez | |
| 7,338,018 B2 * | 3/2008 | Huynh et al. | 244/215 |
| 2007/0020099 A1 | 1/2007 | Hutcheson et al. | |
| 2011/0220761 A1 * | 9/2011 | Ogawa et al. | 244/99.3 |
| 2012/0012696 A1 * | 1/2012 | Sakurai et al. | 244/99.3 |
| 2012/0018588 A1 * | 1/2012 | Lacy et al. | 244/216 |

* cited by examiner

*Primary Examiner* — Christopher P Ellis
*Assistant Examiner* — Medhat Badawi
(74) *Attorney, Agent, or Firm* — Yee & Associates, P.C.

(57) ABSTRACT

A method and apparatus for controlling a movement of a control surface comprises a first linkage system, a second linkage system, and an actuator system. The first linkage system is connected to a first location of a control surface. The second linkage system is connected to a second location of the control surface. The first location is closer to a leading edge of the control surface than the second location. The actuator system is configured to move the first linkage system and the second linkage system.

17 Claims, 10 Drawing Sheets

TRAILING EDGE FLAP SYSTEM

BACKGROUND INFORMATION

1. Field

The present disclosure relates generally to aircraft and, in particular, to control surfaces for aircraft. Still more particularly, the present disclosure relates to a method and apparatus for moving a control surface on an aircraft.

2. Background

The movement of an aircraft in different directions may be controlled using control surfaces. For example, control surfaces may be used to rotate an aircraft to change a pitch, roll, and/or yaw of the aircraft. Additionally, control surfaces also may be used to change the coefficient of lift of wings on an aircraft. A control surface may be, for example, without limitation, an aileron, an elevator, a rudder, a spoiler, a flap, a slat, an airbrake, an elevator trim, or some other suitable type of control surface.

Flaps may be located at the trailing edge of a wing of an aircraft. These flaps are often used to reduce the stalling speed of an aircraft during phases of flight, such as, for example, without limitation, takeoff and landing. In particular, extending flaps increases the camber of the wing airfoil, which, in turn, increases the maximum lift coefficient. The camber is the difference between the top and bottom curves of the wing airfoil. The increase in the maximum lift coefficient allows the aircraft to generate a given amount of lift with a slower speed. In this manner, extending the flaps reduces the stalling speed of the aircraft.

Typically, with currently used aircraft, flaps, along with other control surfaces, are present along a trailing edge of each wing of the aircraft. These other control surfaces may be, for example, flaperons. A flaperon is a control surface that combines aspects of a flap in an aileron. A flaperon may be used to control the roll of an aircraft, but also may be lowered to function in the same way as a flap. The movement of flaps independently of a flaperon may generate more noise than desired.

Therefore, it would be advantageous to have a method and apparatus that takes into account some of the issues discussed above, as well as other possible issues.

SUMMARY

In one advantageous embodiment, an apparatus comprises a first linkage system, a second linkage system, and an actuator system. The first linkage system is connected to a first location of a control surface. The second linkage system is connected to a second location of the control surface. The first location is closer to a leading edge of the control surface than the second location. The actuator system is configured to move the first linkage system and the second linkage system.

In another advantageous embodiment, a method is provided for controlling a movement of a control surface. An actuator system associated with the control surface is operated. The actuator system is configured to move a first linkage system connected to a first location of the control surface and to move a second linkage system connected to a second location of the control surface. The first location is closer to a leading edge of the control surface than the second location. The control surface is moved into a position using the actuator system.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
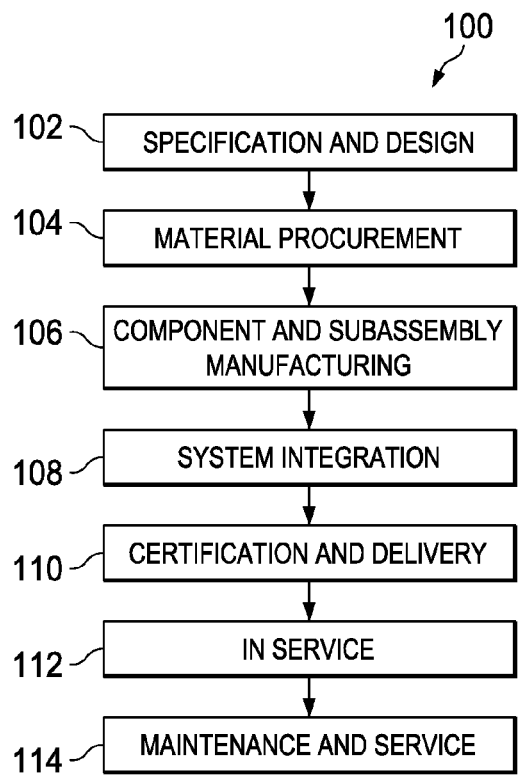
FIG. 1 is an illustration of an aircraft manufacturing and service method in accordance with an advantageous embodiment.
Figure 2:
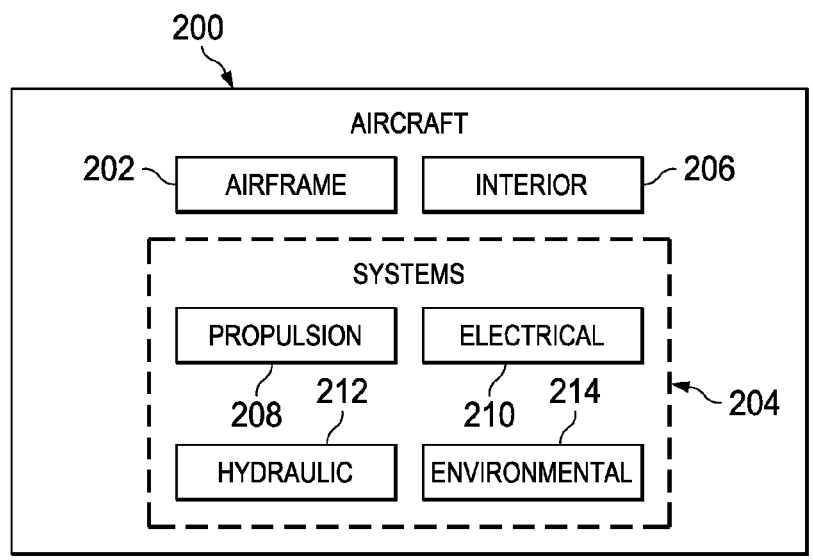
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments may be one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

The different advantageous embodiments recognize and take into account a number of different considerations. For example, the different advantageous embodiments recognize and take into account that different types of control surfaces may be associated with the trailing edge of each wing of an aircraft. The different advantageous embodiments recognize and take into account that these different control surfaces may not all be extended and/or retracted in the same manner.

For example, oftentimes, a number of flaperons and/or ailerons are located on a trailing edge of a wing in addition to flaps. The different advantageous embodiments recognize and take into account that these flaperons and/or ailerons may be deflected at angles different from the angle at which the flaps are deflected. This difference in angles may generate more noise than desired during flight. The different advantageous embodiments recognize and take into account that some or all of these flaperons and/or ailerons may not be needed at the trailing edges of the wings of the aircraft if the flaps at the trailing edges are configured to change the roll of the aircraft in a manner similar to the flaperons.

Additionally, the different advantageous embodiments also recognize and take into account that it would be desirable to reduce the opening that is created between the leading edge of a flap and a fixed structure, such as a wing, during movement of the flap. For example, during a fowler motion of a flap, an opening is created between the leading edge of a flap and the wing as the flap is extended. A fowler motion may be used to move a flap or flaperon to obtain more lift without additional drag.

The different advantageous embodiments recognize and take into account that a reduction in the opening created between the leading edge of the flap and the wing during movement of the flap may reduce the complexity and/or size of a seal needed for sealing the opening.

Thus, the different advantageous embodiments provide a method and apparatus for moving a control surface. In one advantageous embodiment, an apparatus comprises a first linkage system, a second linkage system, and an actuator system. The first linkage system is connected to a first location of the control surface. The second linkage system is connected to a second location of the control surface. The first location is closer to a leading edge of the control surface than the second location in these illustrative examples. The actuator system is configured to move the first linkage system and the second linkage system.

Figure 3:
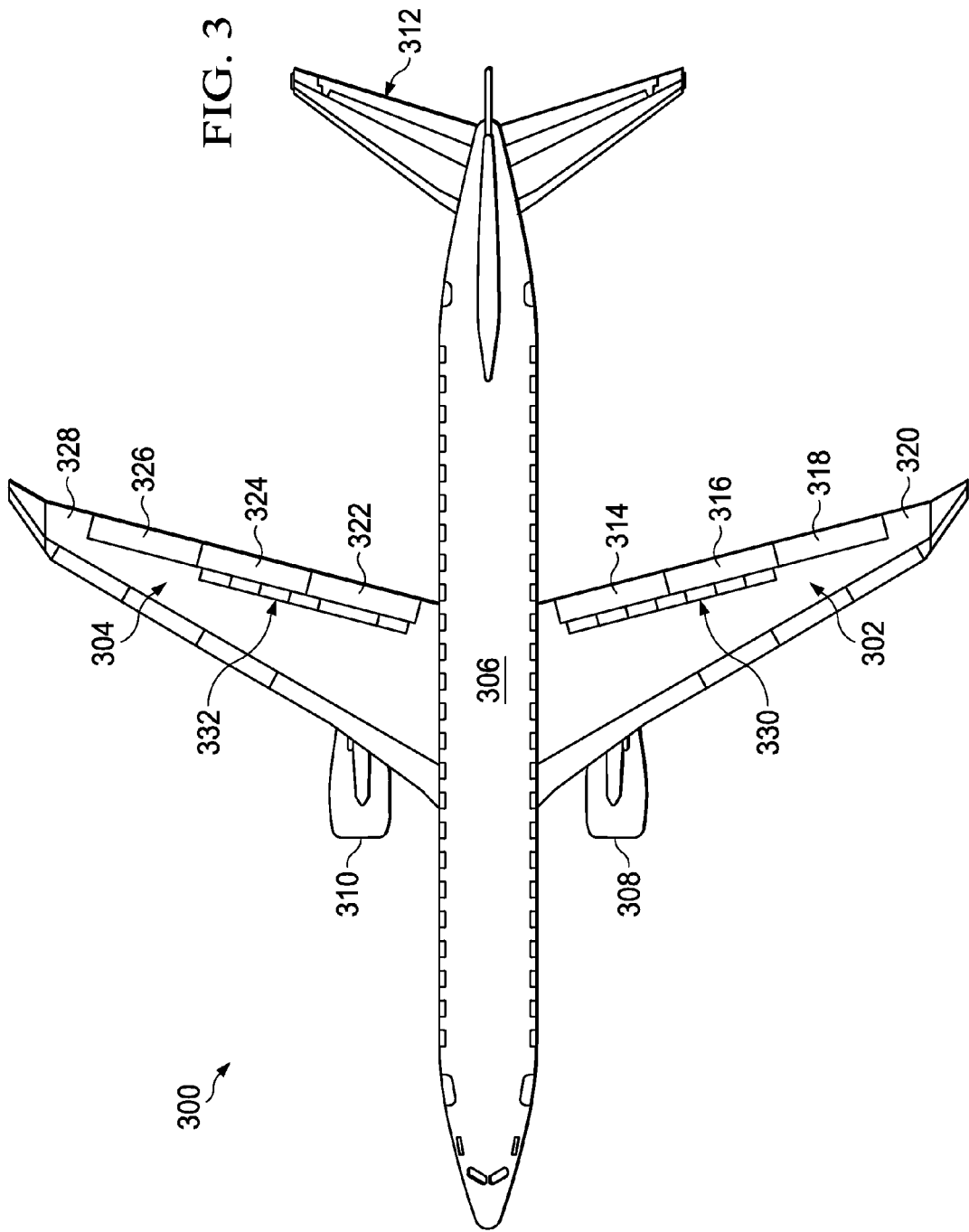
FIG. 3 is an illustration of an aircraft in which an advantageous embodiment may be implemented.

With reference now to FIG. 3, an illustration of an aircraft is depicted in which an advantageous embodiment may be implemented. Aircraft 300 is an example of one implementation for aircraft 200 in FIG. 2. Further, aircraft 300 is an example of an aircraft in which a control surface system may be implemented. In this illustrative example, aircraft 300 has wings 302 and 304 attached to fuselage 306. Aircraft 300 includes wing-mounted engine 308, wing-mounted engine 310, and tail 312.

As depicted in this example, aircraft 300 also includes flap 314, flap 316, and flap 318 associated with trailing edge 320 of wing 302. Additionally, aircraft 300 includes flap 322, flap 324, and flap 326 associated with trailing edge 328 of wing 304. In this illustrative example, flaps 314, 316, 322, and 324 may be referred to as main flaps.

In this illustrative example, a first component, such as a flap, may be considered to be associated with a second component, such as a trailing edge of a wing, by being secured, attached, bonded, fastened, and/or mounted to the second component. Further, the first component may be associated with the second component by being connected to the second component in some other suitable manner. Still further, the first component may also be connected to the second component by using a third component. The first component may also be considered to be associated with the second component by being formed as part of and/or an extension of the second component.

Additionally, in this depicted example, spoilers 330 are associated with wing 302 and spoilers 332 are associated with wing 304. Of course, in these illustrative examples, other control surfaces in addition to and/or in place of the ones shown in FIG. 3 may be associated with aircraft 300. For example, in some illustrative examples, flap 318 and flap 326 may be replaced with ailerons.

The illustration of aircraft 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments.

Figure 4:
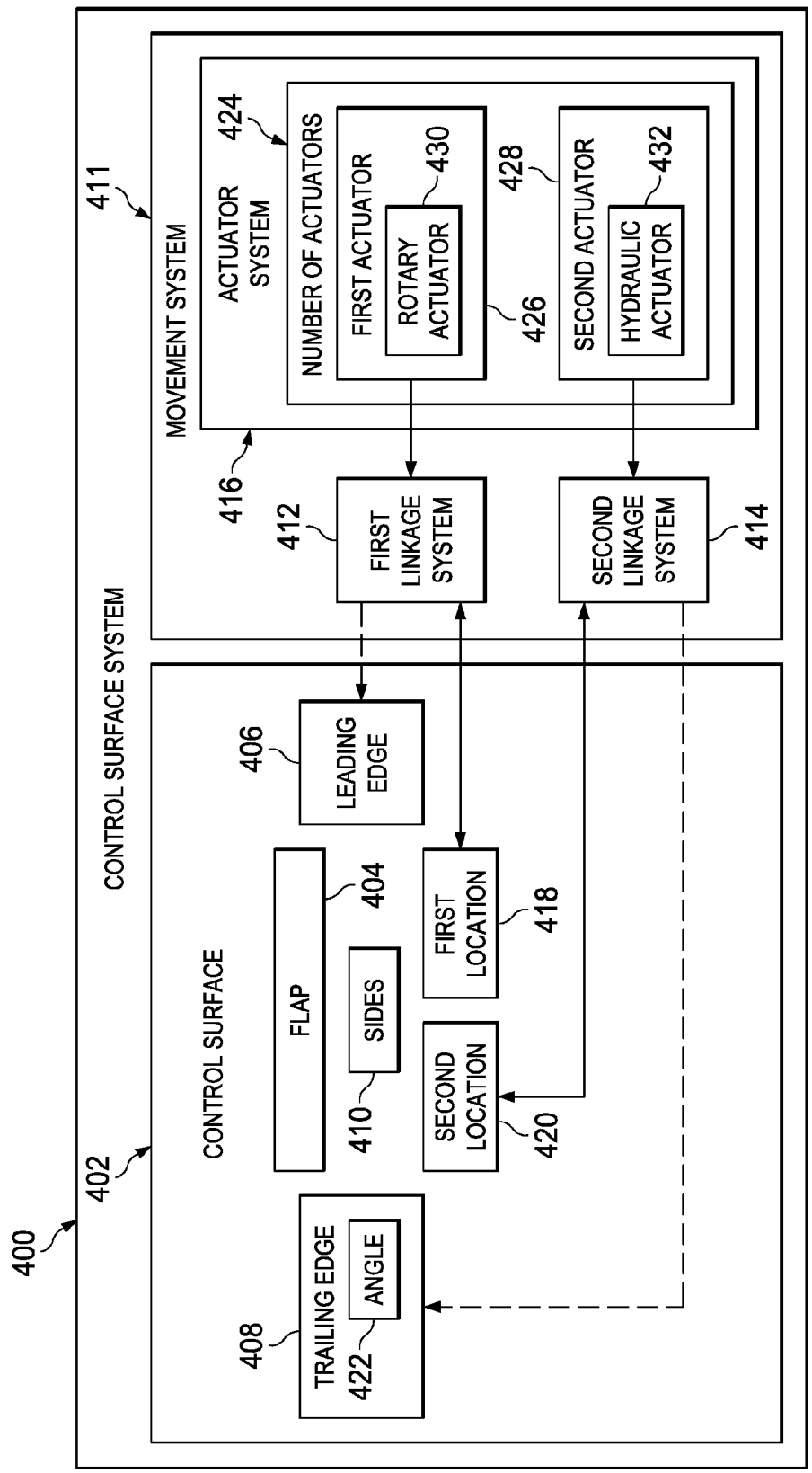
FIG. 4 is an illustration of a control surface system in accordance with an advantageous embodiment.

With reference now to FIG. 4, an illustration of a control surface system is depicted in accordance with an advantageous embodiment. In these illustrative examples, control surface system 400 may be used to implement a control surface associated with a wing of an aircraft, such as wing 302 and/or wing 304 of aircraft 300 in FIG. 3.

As depicted in these examples, control surface system 400 may be used to implement control surface 402 in an aircraft. Control surface 402 takes the form of flap 404 in these examples. Flap 404 may be used to implement any of flaps 314, 316, 318, 322, 324, and 326 for aircraft 300 in FIG. 3. As illustrated, control surface 402 has leading edge 406, trailing edge 408, and sides 410. Leading edge 406 may be connected to the wing of the aircraft.

In these illustrative examples, control surface system 400 also includes movement system 411 associated with control surface 402. Movement system 411 is configured to allow control surface 402 to move in a number of different directions.

In these depicted examples, movement system 411 may be connected to control surface 402 during at least one of the processes in aircraft manufacturing and service method 100 in FIG. 1. For example, movement system 411 may be connected to control surface 402 during at least one of component and subassembly manufacturing 106, system integration 108, in service 112, and maintenance and service 114 in FIG. 1.

As used herein, the phrase "at least one of", when used with a list of items, means that different combinations of one or more of the listed items may be used and only one of each item in the list may be needed. For example, "at least one of process A, process B, and process C" may include, for example, without limitation, process A or process A and process B. This example also may include process A, process B, and process C or process B and process C.

Movement system 411 comprises first linkage system 412, second linkage system 414, and actuator system 416. First linkage system 412 and second linkage system 414 are configured to connect control surface 402 to the wing of an aircraft. In particular, each of first linkage system 412 and second linkage system 414 is connected to both control surface 402 and the wing of the aircraft. In some illustrative examples, actuator system 416 connects first linkage system 412 and second linkage system 414 to the wing of the aircraft.

In these illustrative examples, first linkage system 412 is connected to first location 418 of control surface 402. Second linkage system 414 is connected to second location 420 of control surface 402. First location 418 and second location 420 may be on the surface of control surface 402 or in a frame or structure within control surface 402.

First location 418 is located closer to leading edge 406 of control surface 402 than second location 420. In these illustrative examples, first location 418 may be substantially at leading edge 406 of control surface 402. Further, second location 420 is located closer to trailing edge 408 than first location 418.

First linkage system 412 and second linkage system 414, in these illustrative examples, are each a series of rigid links connected with joints. The joints may have various degrees of freedom to allow motion between the links. The links may be, for example, without limitation, rods, beams, elongate members, planar members, and/or other suitable types of links.

In these illustrative examples, first linkage system 412 is configured to move leading edge 406 of control surface 402 relative to the wing of the aircraft. For example, the movement of control surface 402 by first linkage system 412 may move leading edge 406 of control surface 402 away from or towards the wing of the aircraft. This movement of leading edge 406 of control surface 402 by first linkage system 412 may be referred to as a fowler motion.

Additionally, first linkage system 412 is configured to tilt control surface 402. For example, without limitation, first linkage system 412 may be used to tilt control surface 402 from about zero degrees up to about 35 degrees. Control surface 402 may be tilted to increase wing camber to produce lift.

Second linkage system 414 is configured to move trailing edge 408 of control surface 402. The movement of trailing edge 408 may be such that angle 422 of trailing edge 408, relative to leading edge 406, is changed. Angle 422 may be in an upwards direction and/or a downwards direction. In these illustrative examples, angle 422 may be changed from about zero degrees to about seven degrees relative to leading edge 406. In other words, angle 422 of trailing edge 408 may be from about zero degrees to about seven degrees below leading edge 406 or above leading edge 406.

When control surface 402 is flap 404, the movement of trailing edge 408 of flap 404 by second linkage system 414 allows flap 404 to operate in a manner similar to an aileron or flaperon. In other words, the movement of trailing edge 408 of flap 404 by second linkage system 414 allows roll of the aircraft to be controlled. In these illustrative examples, when flap 404 and/or other flaps associated with the trailing edges of the wings of an aircraft have second linkage system 414, the roll of the aircraft may be controlled without the use of ailerons and/or flaperons.

In these illustrative examples, actuator system 416 may move first linkage system 412 and second linkage system 414 independently of each other. In other words, actuator system 416 may move first linkage system 412 without moving second linkage system 414. Actuator system 416 also may move second linkage system 414 without moving first linkage system 412. In other examples, both first linkage system 412 and second linkage system 414 may be moved by actuator system 416.

Actuator system 416, in these illustrative examples, comprises number of actuators 424. Number of actuators 424 may include, for example, without limitation, rotary actuators, linear actuators, hydraulic actuators, geared actuators, and/or other suitable types of actuators.

Number of actuators 424 includes first actuator 426 and second actuator 428. First actuator 426 may take the form of, for example, rotary actuator 430, in these examples. Further, second actuator 428 may take the form of, for example, hydraulic actuator 432.

First actuator 426 is configured to control the movement of first linkage system 412. Second actuator 428 is configured to control the movement of second linkage system 414. In these depicted examples, first actuator 426 and second actuator 428 are configured to control the movements of first linkage system 412 and second linkage system 414, respectively, independent from each other.

In these illustrative examples, second actuator 428 may be configured to move control surface 402 at high speeds. For example, second actuator 428 may be configured to move control surface 402 at speeds from about 30 degrees per second to about 60 degrees per second.

Further, in these examples, first actuator 426 may be configured to move control surface 402 at speeds slower than second actuator 428. For example, first actuator 426 may be configured to move control surface 402 at speeds from about one degree per second to about two degrees per second. In other illustrative examples, first actuator 426 may be configured to move control surface 402 at speeds closer to or substantially the same as second actuator 428.

The illustration of control surface system 400 in FIG. 4 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some illustrative examples, control surface 402 may take the form of some other suitable type of control surface instead of flap 404. For example, control surface 402 may be an elevator, an aileron, a rudder, a flaperon, or some other suitable type of control surface.

In other illustrative examples, movement system 411 may include other linkage systems in addition to first linkage system 412 and second linkage system 414. These other linkage systems may be configured to move control surface 402 in different directions and/or move at least one of trailing edge 408 and leading edge 406 relative to one another. In still other illustrative examples, two or more actuators may be used to perform the functions of second actuator 428.

Figure 5:
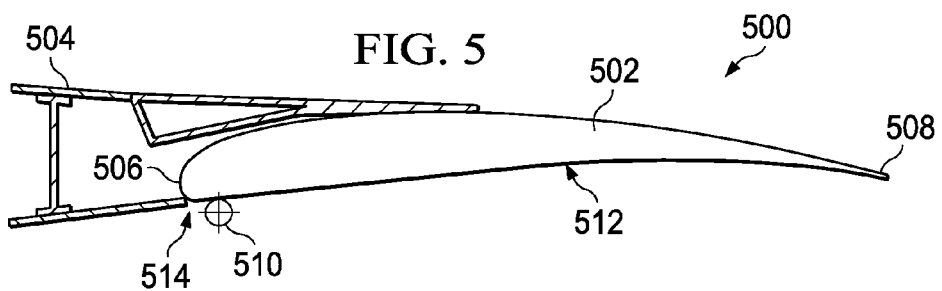
FIG. 5 is an illustration of a control surface system in accordance with an advantageous embodiment.
Figure 6:
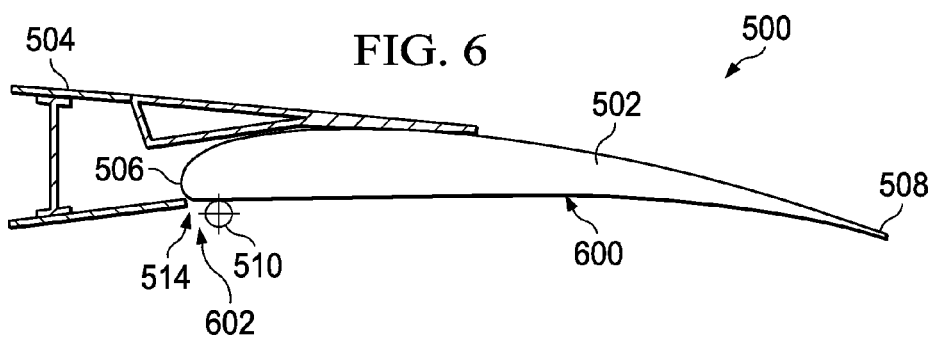
FIG. 6 is an illustration of a control surface system in accordance with an advantageous embodiment.
Figure 7:
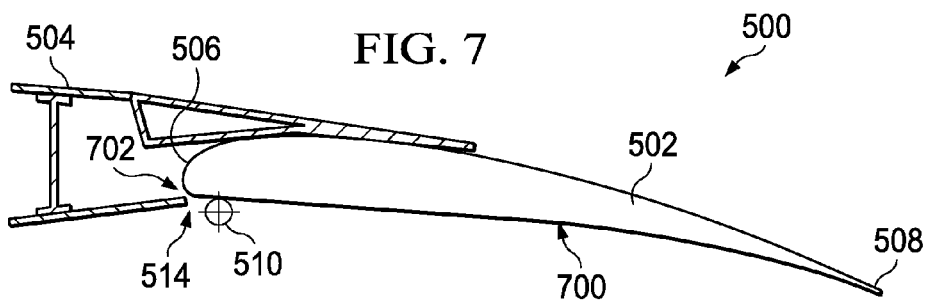
FIG. 7 is an illustration of a control surface system in accordance with an advantageous embodiment.

With reference now to FIGS. 5-7, illustrations of a control surface system are depicted in accordance with an advantageous embodiment. Control surface system 500 in FIGS. 5-7 may be implemented using control surface system 400 in FIG. 4.

Turning now to FIG. 5, control surface system 500 includes control surface 502 associated with wing 504. Wing 504 is a fixed wing for an aircraft, such as wing 302 and wing 304 for aircraft 300 in FIG. 3. Control surface 502 is a flap in these illustrative examples.

As depicted, control surface 502 has leading edge 506 and trailing edge 508. Control surface 502 is configured to rotate about axis 510 using a movement system, such as movement system 411 having first linkage system 412, second linkage system 414, and actuator system 416 in FIG. 4. Axis 510 is substantially at leading edge 506 in these illustrative examples.

As illustrated, control surface 502 is in position 512. In position 512, the angle of trailing edge 508, relative to leading edge 506, is about two degrees above leading edge 506. Further, in position 512, an opening at location 514 between leading edge 506 of control surface 502 and wing 504 is substantially absent.

Turning now to FIG. 6, control surface 502 has been moved to position 600 from position 512 in FIG. 5 using movement system 411 in FIG. 4. In position 600, the angle of trailing edge 508 relative to leading edge 506 is about zero degrees.

Further, as depicted, in position 600, opening 602 is present between leading edge 506 of control surface 502 and wing 504. Opening 602, however, has a smaller size, as compared to the size of the opening that would be created between leading edge 506 and wing 504 if a currently available system for moving a control surface was used to move control surface 502 instead of movement system 411 in FIG. 4.

With opening 602 being smaller, a simpler aerodynamic seal may be used to cover opening 602, as compared to the more complex aerodynamic seal that may be used with currently available systems.

Turning now to FIG. 7, control surface 502 has been moved to position 700 from position 600 in FIG. 6 using movement system 411 in FIG. 4. In position 700, the angle of trailing edge 508 relative to leading edge 506 is about two degrees below leading edge 506.

Further, as depicted, in position 700, opening 702 is present between leading edge 506 of control surface 502 and wing 504. Opening 702, however, has a smaller size, as compared to the size of the opening that would be created between leading edge 506 and wing 504 if a currently available system for moving a control surface was used to move control surface 502 instead of movement system 411 in FIG. 4.

With opening 702 being smaller, a simpler aerodynamic seal may be used to cover opening 702, as compared to the more complex aerodynamic seal that may be used with currently available systems.

With reference now to FIGS. 8-15, illustrations of a control surface system are depicted in accordance with an advantageous embodiment. Control surface system 800 in FIGS. 8-15 may be an example of one implementation for control surface system 400 in FIG. 4.

Figure 8:
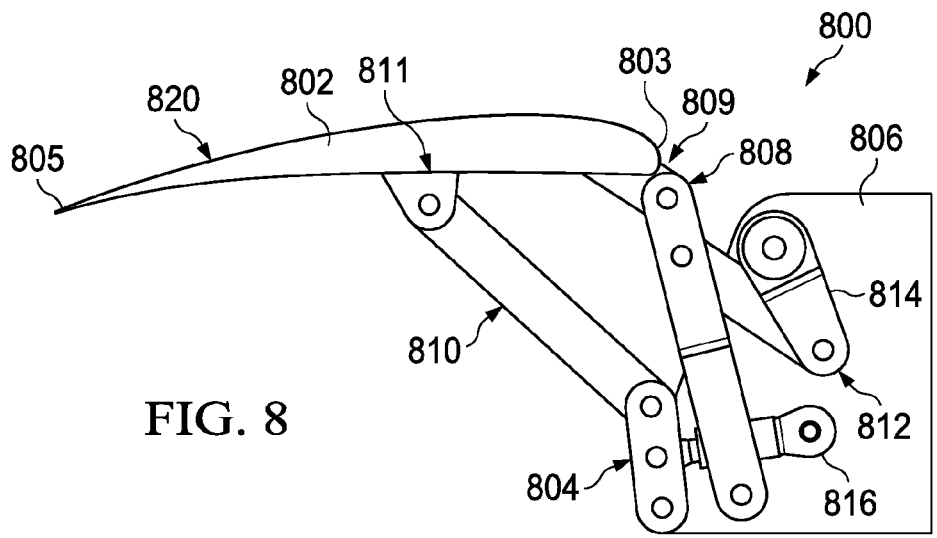
FIG. 8 is an illustration of a control surface system in accordance with an advantageous embodiment.

Turning now to FIG. 8, an illustration of a side view of control surface system 800 is depicted in accordance with an advantageous embodiment. Control surface system 800 includes control surface 802 and movement system 804. Control surface 802 is a flap in these illustrative examples. Control surface 802 has leading edge 803 and trailing edge 805.

As depicted, movement system 804 connects control surface 802 to wing 806. Wing 806, in these examples, is a fixed wing for an aircraft, such as wing 302 and wing 304 for aircraft 300 in FIG. 3. Movement system 804 includes first linkage system 808, second linkage system 810, and actuator system 812.

In these illustrative examples, first linkage system 808 is connected to first location 809 on control surface 802. Second linkage system 810 is connected to second location 811 on control surface 802.

Further, actuator system 812 comprises first actuator 814 and second actuator 816. First actuator 814 is a rotary actuator, while second actuator 816 is a hydraulic actuator in these examples. First actuator 814 connects first linkage system 808 to wing 806. Second actuator 816 connects second linkage system 810 to wing 806.

In this depicted example, control surface 802 is in position 820. In position 820, the angle of trailing edge 805 relative to leading edge 803 is about zero degrees.

Figure 9:
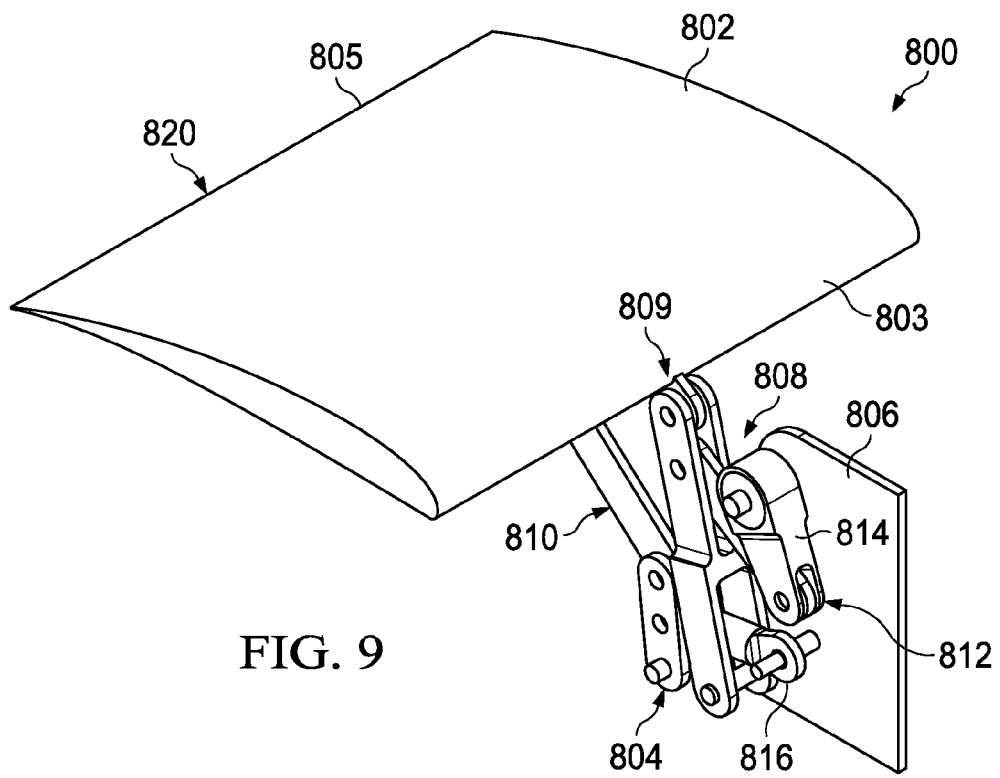
FIG. 9 is an illustration of a control surface system in accordance with an advantageous embodiment.

Turning now to FIG. 9, an illustration of a perspective view of control surface system 800 is depicted in accordance with an advantageous embodiment. In this illustrative example, control surface 802 is in position 820.

Figure 10:
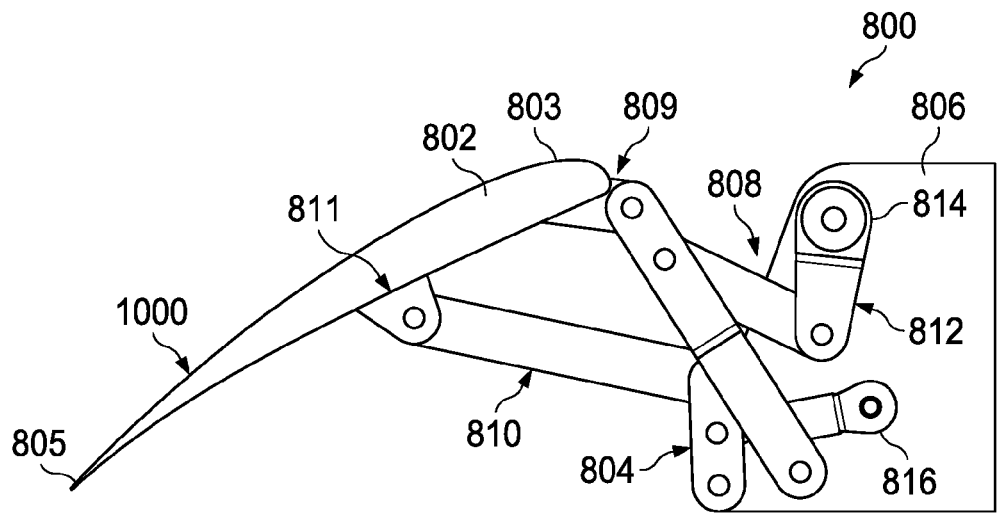
FIG. 10 is an illustration of a control surface system in accordance with an advantageous embodiment.

With reference now to FIG. 10, an illustration of a side view of control surface system 800 is depicted. Control surface 802 is in position 1000. In position 1000, the angle of trailing edge 805, relative to leading edge 803, is about 40 degrees below leading edge 803.

In this illustrative example, control surface 802 is moved from position 820 in FIG. 8 to position 1000 using first linkage system 808 for movement system 804. In particular, first actuator 814 for actuator system 812 moves first linkage system 808, which, in turn, moves control surface 802 to position 1000. First linkage system 808 moves leading edge 803 away from wing 806. Further, first linkage system 808 tilts control surface 802 such that trailing edge 805 is moved downwards relative to leading edge 803.

In this illustrative example, second actuator 816 does not operate to move control surface 802 to position 1000. Further, as depicted, movement of control surface 802 to position 1000 causes the links in second linkage system 810 to move relative to each other.

Figure 11:
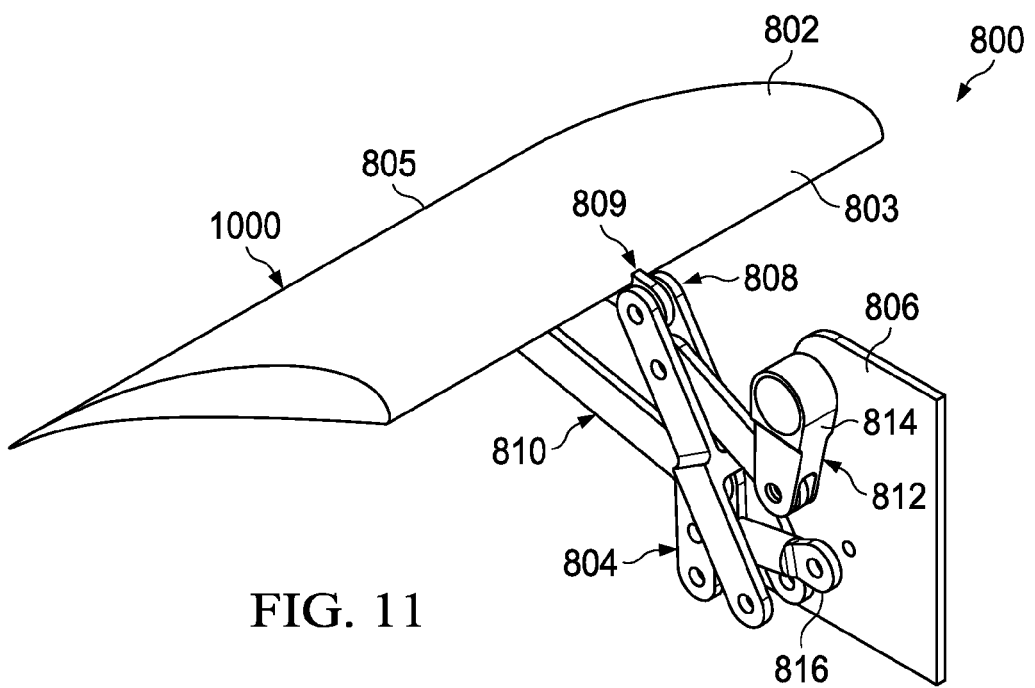
FIG. 11 is an illustration of a control surface system in accordance with an advantageous embodiment.

Turning now to FIG. 11, an illustration of a perspective view of control surface system 800 in position 1000 is depicted.

Figure 12:
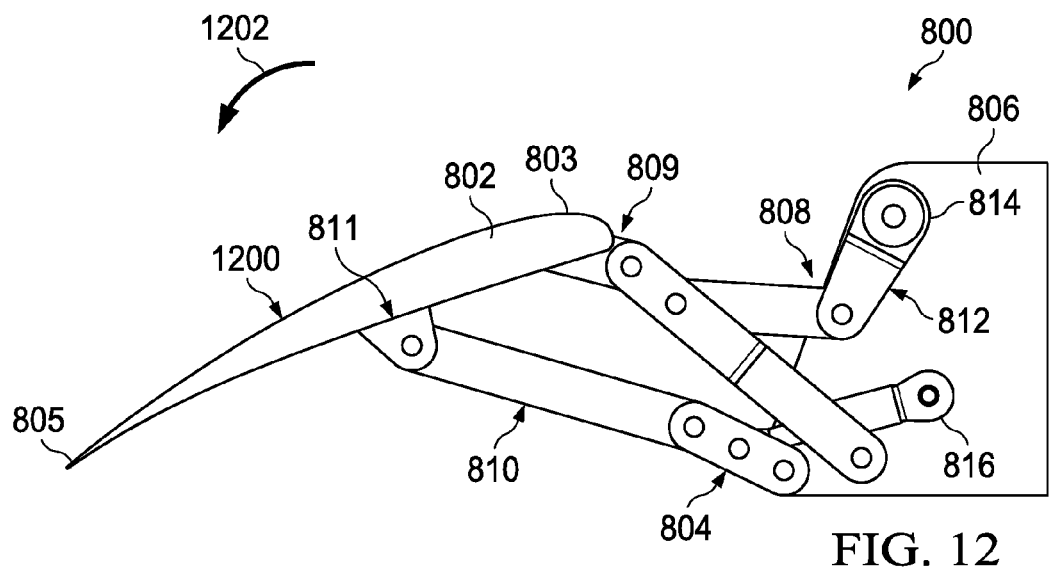
FIG. 12 is an illustration of a control surface system in accordance with an advantageous embodiment.

With reference now to FIG. 12, an illustration of a side view of control surface system 800 is depicted with control surface 802 in position 1200. In position 1200, the angle of trailing edge 805 relative to leading edge 803 is about 33 degrees below leading edge 803.

In this illustrative example, movement system 804 moves control surface 802 from position 820 in FIG. 8 to position 1200. Control surface 802 is moved using both first linkage system 808 and second linkage system 810.

In particular, first actuator 814 moves first linkage system 808 to move leading edge 803 of control surface 802 away from wing 806. Further, movement of first linkage system 808 tilts control surface 802 about 40 degrees. In other words, control surface 802 is rotated about 40 degrees in the direction of arrow 1202.

Additionally, second actuator 816 moves second linkage system 810 to move trailing edge 805. In this illustrative example, movement of second linkage system 810 moves trailing edge 805 relative to leading edge 803. In particular, trailing edge 805 is moved such that the angle of trailing edge 805 relative to leading edge 803 is changed about seven degrees. In this manner, movement system 804 moves control surface 802 such that in position 1200, the overall angle of trailing edge 805 relative to leading edge 803 is about 33 degrees below leading edge 803.

Figure 13:
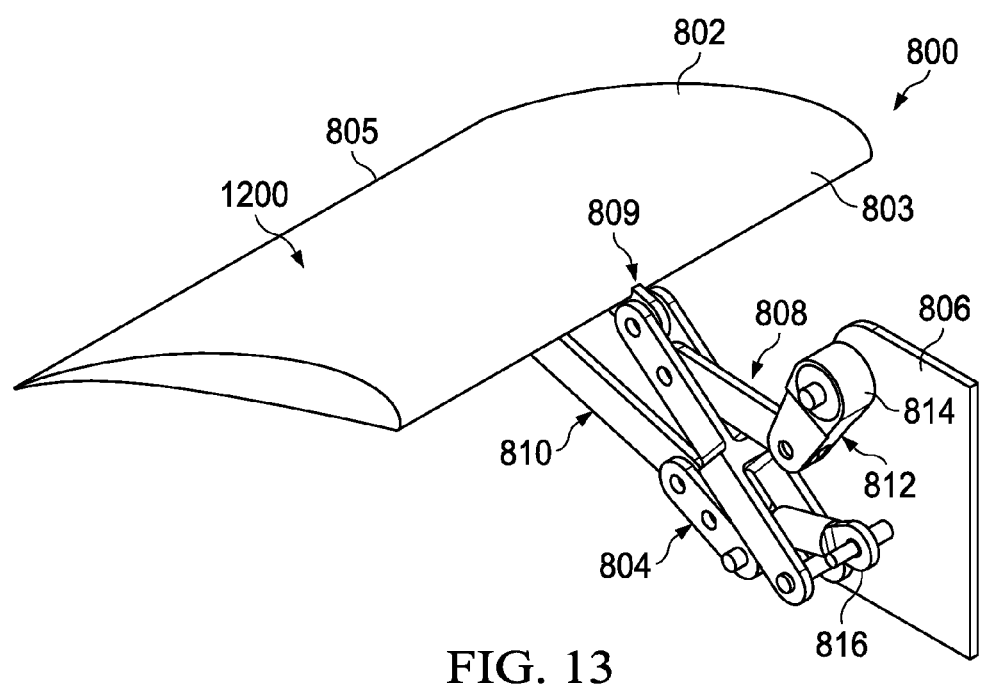
FIG. 13 is an illustration of a control surface system in accordance with an advantageous embodiment.

In FIG. 13, an illustration of a perspective view of control surface system 800 with control surface 802 in position 1200 is depicted.

Figure 14:
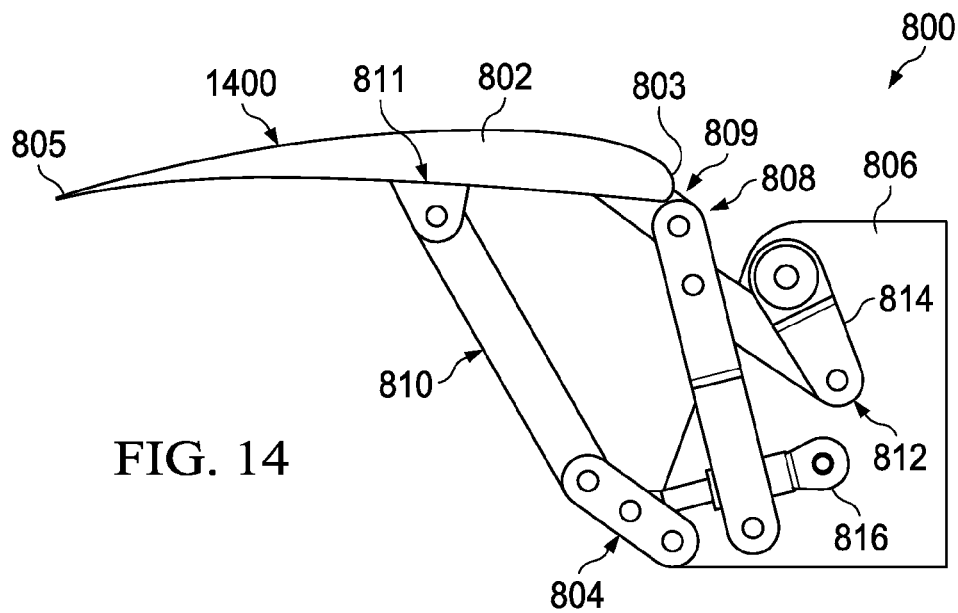
FIG. 14 is an illustration of a control surface system in accordance with an advantageous embodiment.

With reference now to FIG. 14, an illustration of a side view of control surface system 800 with control surface 802 in position 1400 is depicted in accordance with an advantageous embodiment. In position 1400, the angle of trailing edge 805 relative to leading edge 803 is about five degrees above leading edge 803.

In this illustrative example, movement system 804 moves control surface 802 from position 820 in FIG. 8 to position 1400. Control surface 802 is moved using second linkage system 810. Second actuator 816 moves second linkage system 810 to move control surface 802.

Figure 15:
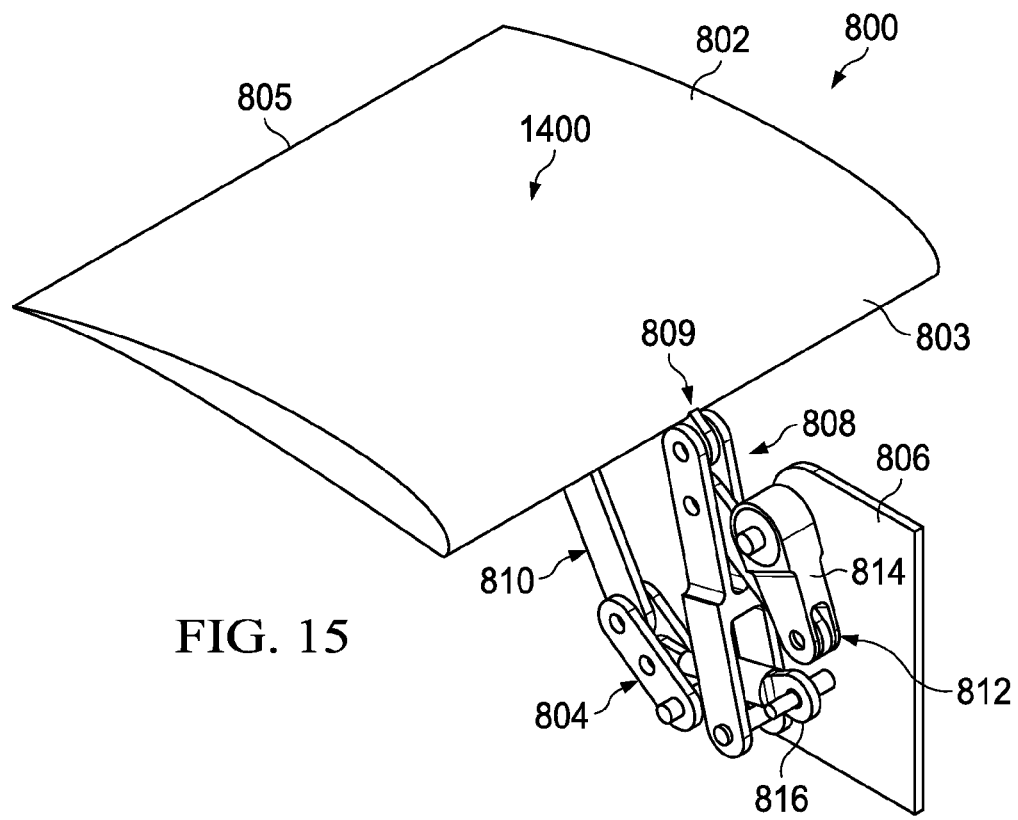
FIG. 15 is an illustration of a control surface system in accordance with an advantageous embodiment.

In FIG. 15, an illustration of a perspective view of control surface system 800 with control surface 802 in position 1400 is depicted.

In these different illustrative examples, control surface 802 may be moved into a number of other positions in addition to the ones depicted in FIGS. 8-15. Further, first actuator 814 and second actuator 816 may control first linkage system 808 and second linkage system 810, respectively, independently of each other to move control surface 802 into a number of different positions.

For example, first actuator 814 may operate to move first linkage system 808 when second actuator 816 does not operate. Similarly, second actuator 816 may operate to move second linkage system 810 when first actuator 814 does not operate. Further, first actuator 814 and second actuator 816 may operate to move first linkage system 808 and second linkage system 810, respectively, at the same time.

The illustrations of control surface system 800 in FIGS. 8-15 are not meant to imply physical or architectural limitations to the manner in which different advantageous embodiments may be implemented. Other components in addition to and/or in place of the ones illustrated may be used. Some components may be unnecessary in some advantageous embodiments.

Figure 16:
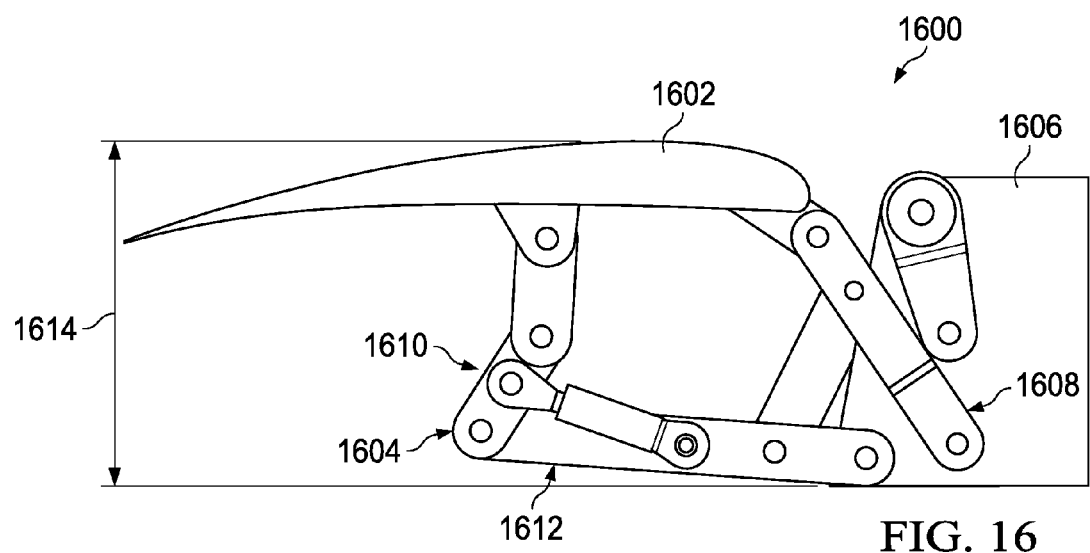
FIG. 16 is an illustration of a control surface system in accordance with an advantageous embodiment.

With reference now to FIG. 16, an illustration of a control surface system is depicted in accordance with an advantageous embodiment. In this illustrative example, control surface system 1600 is an example of another implementation for control surface system 400 in FIG. 4.

As depicted, control surface system 1600 includes control surface 1602 and movement system 1604. Control surface 1602 is a flap in these illustrative examples. Movement system 1604 connects control surface 1602 to wing 1606. Wing 1606, in these examples, is a fixed wing for an aircraft, such as wing 302 and wing 304 for aircraft 300 in FIG. 3. Movement system 1604 includes first linkage system 1608, second linkage system 1610, and actuator system 1612.

In this illustrative example, first linkage system 1608 and second linkage system 1610 have a greater number of links as compared to control surface system 800 in FIG. 8. The additional links present in first linkage system 1608 and second linkage system 1610 allow height 1614 to be reduced as compared to when a fewer number of links are present in first linkage system 1608 and second linkage system 1610. This reduction in height 1614 reduces drag for the aircraft.

Of course, in other illustrative examples, any number of links may be present in first linkage system 1608 and/or second linkage system 1610.

Figure 17:
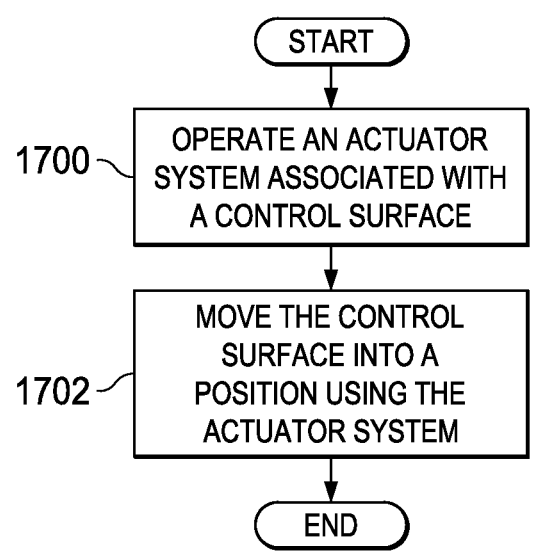
FIG. 17 is an illustration of a flowchart of a process for controlling movement of a control surface in accordance with an advantageous embodiment.

With reference now to FIG. 17, an illustration of a flowchart of a process for controlling movement of a control surface is depicted in accordance with an advantageous embodiment. The process illustrated in FIG. 17 may be implemented using control surface system 400 in FIG. 4.

The process begins by operating an actuator system associated with a control surface (operation 1700). The actuator system is configured to move a first linkage system connected to a first location of the control surface and to move a second linkage system connected to a second location of the control surface. The first location is closer to a leading edge of the control surface than the second location.

Further, the actuator system connects the first linkage system and the second linkage system to a wing of an aircraft. In this manner, the control surface is connected to the wing of the aircraft by the actuator system.

Thereafter, the process moves the control surface into a position using the actuator system (operation 1702), with the process terminating thereafter. Operation of the actuator system may move the first linkage system, the second linkage system, or a combination of the two. The first linkage system may be moved to move the leading edge of the control surface away from and/or towards the wing of the aircraft. Further, the first linkage system may be configured to tilt the control surface.

The second linkage system may be moved to move a trailing edge of the control surface relative to the leading edge of the control surface. For example, the trailing edge may be moved such that an angle of the trailing edge relative to the leading edge is changed.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Also, other blocks may be added in addition to the illustrated blocks in a flowchart or block diagram.

Thus, the different advantageous embodiments provide a method and apparatus for moving a control surface. In one advantageous embodiment, an apparatus comprises a first linkage system, a second linkage system, and an actuator system. The first linkage system is connected to a first location of a control surface. The second linkage system is connected to a second location of the control surface. The first location is closer to a leading edge of the control surface than the second location in these illustrative examples. The actuator system is configured to move the first linkage system and the second linkage system.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a first linkage system connected to a first location of a single control surface, wherein the single control surface is connected to a wing of an aircraft, the first linkage system configured to move a leading edge of the single control surface relative to the wing of the aircraft, and wherein movement of the leading edge of the single control surface relative to the wing of the aircraft by the first linkage system is a fowler motion;
   a second linkage system connected to a second location of the single control surface, wherein the first location is closer to the leading edge of the single control surface than the second location; and
   an actuator system configured to move the first linkage system and the second linkage system independently of each other.

2. The apparatus of claim 1, wherein the second linkage system is configured to move a trailing edge of the single control surface.

3. The apparatus of claim 2, wherein movement of the trailing edge by the second linkage system changes an angle of the trailing edge relative to the leading edge.

4. The apparatus of claim 1, wherein the first linkage system and the second linkage system are connected to the wing of the aircraft by the actuator system.

5. The apparatus of claim 1, wherein the actuator system comprises:
   a first actuator associated with the first linkage system and configured to move the first linkage system to move the single control surface; and
   a second actuator associated with the second linkage system and configured to move the second linkage system to move the single control surface, wherein the first actuator moves the first linkage system independently of the second actuator moving the second linkage system.

6. The apparatus of claim 1, wherein the actuator system comprises a number of actuators selected from a group comprising at least one of a hydraulic actuator and a rotary actuator.

7. The apparatus of claim 1, wherein the first linkage system is configured to tilt the single control surface.

8. The apparatus of claim 1, wherein the single control surface is selected from a group comprising a flap, an aileron, a rudder, an elevator, a flaperon, a spoiler, and an airbrake.

9. A method for controlling a movement of a single control surface, the method comprising:
   operating an actuator system associated with the single control surface, wherein the actuator system is configured to move a first linkage system connected to a first location of the single control surface and to move a second linkage system connected to a second location of the single control surface independently of each other, wherein the first location is closer to a leading edge of the single control surface than the second location, wherein the single control surface is connected to a wing of an aircraft; and
   moving the single control surface into a position using the actuator system, wherein moving the single control surface into the position using the actuator system comprises moving the leading edge of the single control surface relative to the wing of the aircraft using the first linkage system, and wherein movement of the leading edge of the single control surface relative to the wing of the aircraft by the first linkage system is a fowler motion.

10. The method of claim 9, wherein the step of moving the single control surface into the position using the actuator system further comprises:
    moving a trailing edge of the single control surface using the second linkage system.

11. The method of claim 10, wherein the step of moving the trailing edge of the single control surface using the second linkage system further comprises:
    moving the trailing edge of the single control surface using the second linkage system to change an angle of the trailing edge relative to the leading edge.

12. The method of claim 9, wherein the first linkage system and the second linkage system are connected to the wing of the aircraft by the actuator system.

13. The method of claim 9, wherein the actuator system comprises a first actuator associated with the first linkage system and a second actuator associated with the second linkage system and wherein the step of moving the single control surface into the position using the actuator system further comprises:
    moving the first linkage system using the first actuator to move the single control surface into the position; and
    moving the second linkage system using the second actuator to move the single control surface into the position, wherein the first actuator moves the first linkage system independently of the second actuator moving the second linkage system.

14. The method of claim 9, wherein the actuator system comprises a number of actuators selected from a group comprising at least one of a hydraulic actuator and a rotary actuator.

15. The method of claim 9, wherein the step of moving the single control surface into the position using the actuator system further comprises:
    moving the first linkage system using the actuator system to tilt the single control surface.

16. The apparatus of claim 1, wherein the actuator system comprises a first actuator and a second actuator, wherein the first actuator connects the first linkage system to the wing, and wherein the second actuator connects the second linkage system to the wing.

17. The method of claim 9, wherein the actuator system comprises a first actuator and a second actuator, wherein the first actuator connects the first linkage system to the wing, and wherein the second actuator connects the second linkage system to the wing.

\* \* \* \* \*